United States Patent [19]
Murata et al.

[11] Patent Number: 5,222,209
[45] Date of Patent: Jun. 22, 1993

[54] SCHEDULE DISPLAYING DEVICE

[75] Inventors: Kaoru Murata, Nara; Eichika Matsuda, Yamatotakada, both of Japan

[73] Assignee: Sharp Kabushiki Kaisha, Osaka, Japan

[21] Appl. No.: 390,970

[22] Filed: Aug. 8, 1989

[30] Foreign Application Priority Data

| Aug. 12, 1988 | [JP] | Japan | 63-202502 |
| Aug. 17, 1988 | [JP] | Japan | 63-204000 |
| Aug. 17, 1988 | [JP] | Japan | 63-204284 |

[51] Int. Cl.⁵ .............. G06F 15/40; G04B 19/24
[52] U.S. Cl. .................. 395/161; 395/155; 368/29; 368/251; 340/706
[58] Field of Search ........ 364/518, 521, 522; 340/747, 750, 703, 706; 368/29, 251; 395/155, 161

[56] References Cited

U.S. PATENT DOCUMENTS

| 4,459,036 | 7/1984 | Sado et al. | 368/251 |
| 4,472,069 | 9/1984 | Yamamoto | 364/273 |
| 4,589,780 | 5/1986 | Takebe | 368/245 |
| 4,715,010 | 12/1987 | Inoue et al. | 364/705 |
| 4,896,306 | 1/1990 | Sanbongi et al. | 368/29 |
| 4,896,308 | 1/1990 | Hwang | 368/75 |

FOREIGN PATENT DOCUMENTS 61-267163 11/1986 Japan.
62-059894 3/1987 Japan.

Primary Examiner—Phu K. Nguyen
Attorney, Agent, or Firm—Sandler, Greenblum & Bernstein

[57] ABSTRACT

A schedule displaying device is provided with a comparator and a controller in addition to a memory, an input device, a display, and a timer. Thus, the scheduled plans are stored and displayed together with the respective scheduled time in a corresponding manner and in time sequence. Moreover, the number of the scheduled plans is arranged to be counted and displayed for each day of the week in the schedule displaying device.

15 Claims, 15 Drawing Sheets

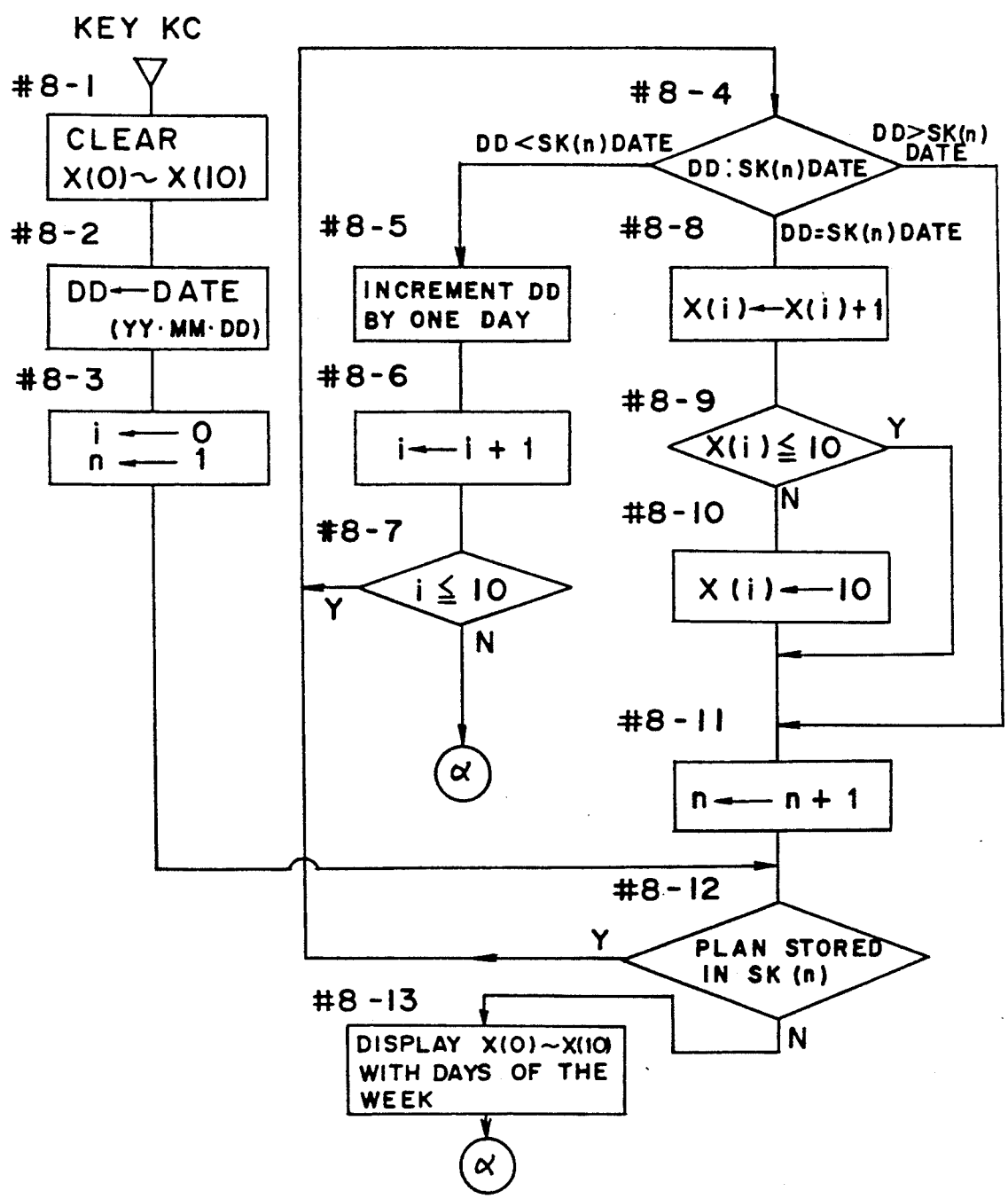

Fig. 13
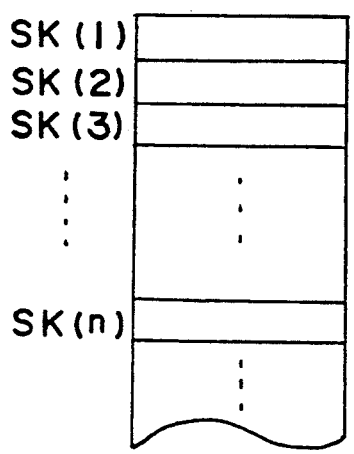
Fig. 14
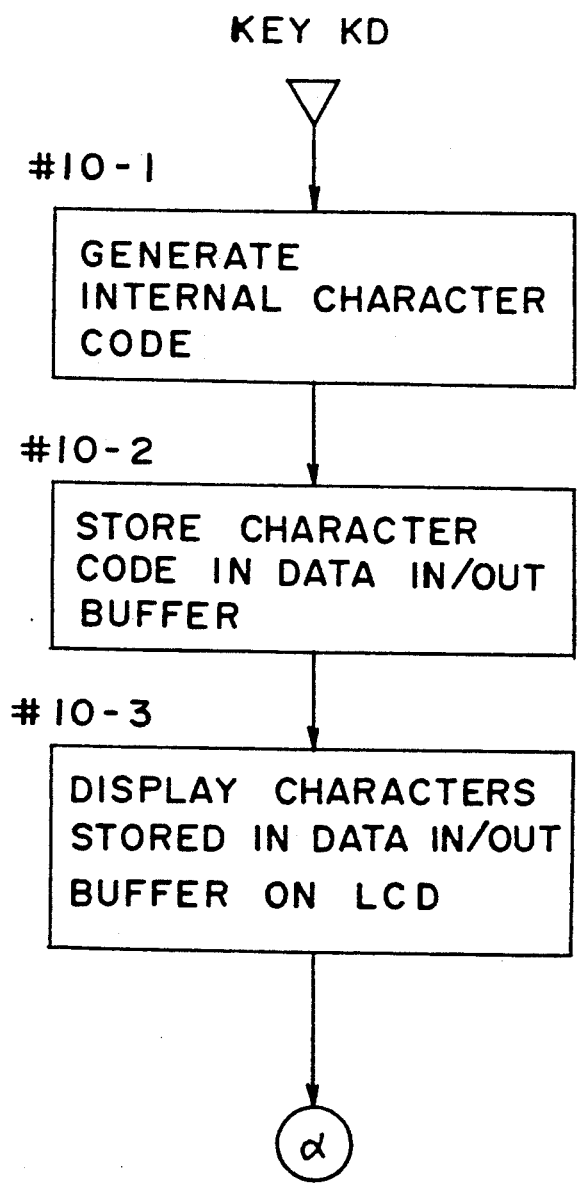
Fig. 16

SCHEDULE DISPLAYING DEVICE

BACKGROUND OF THE INVENTION

1. Field of the Invention

The present invention relates to a schedule displaying device adapted to store scheduled plans and to display the scheduled plans in time sequence.

2. Description of the Prior Art

For example, Japanese Patent Laid-open Publication No. 61-267163 discloses a schedule displaying device of the type referred to above which can inform only the presence or absence of a plan or plans scheduled for each day of the week in spite of a large displaying screen assigned therefor. Meanwhile, in another Japanese Patent Laid-open Publication No. 62-59894, it can be known whether or not a plan or plans are scheduled for the morning or afternoon of each day of the week, but a large display is necessary so that the schedule of the month can be seen from one sight.

SUMMARY OF THE INVENTION

Accordingly, the present invention has for its essential object to provide an improved schedule displaying device which can indicate the number of scheduled plans for each day of the week in a small displaying screen (having two rows, each in 12 digits), thereby to realize an efficient retrieval of the plans in a reduced time.

In accomplishing the above-described object the schedule displaying device of the present invention is comprised of an input means, a display means, a timer means, a comparison means and a control means, wherein the scheduled plan or plans are stored and displayed together with the corresponding dates in time sequence. Furthermore, in the schedule displaying device of the present invention, the number of scheduled plans are arranged to be counted and displayed for each day of the week.

BRIEF DESCRIPTION OF THE DRAWINGS

These and other objects and features of the present invention will become apparent from the following description taken in conjunction with one preferred embodiment thereof with reference to the accompanying drawings, throughout which like parts are designated by like reference numerals, in which:

FIG. 10 shows an example of a display in a display

FIG. 11 shows an example of a display of the number of scheduled plans;

FIG. 12 is a flow-chart showing an operation of a control portion;

FIG. 13 is a diagram showing a part of a data memory portion;

FIG. 14 is a flow-chart showing an operation carried out in response to depression of a key KD;

FIG. 16 shows a display when a vacant space is not

DETAILED DESCRIPTION OF THE EMBODIMENT

Figure 1:
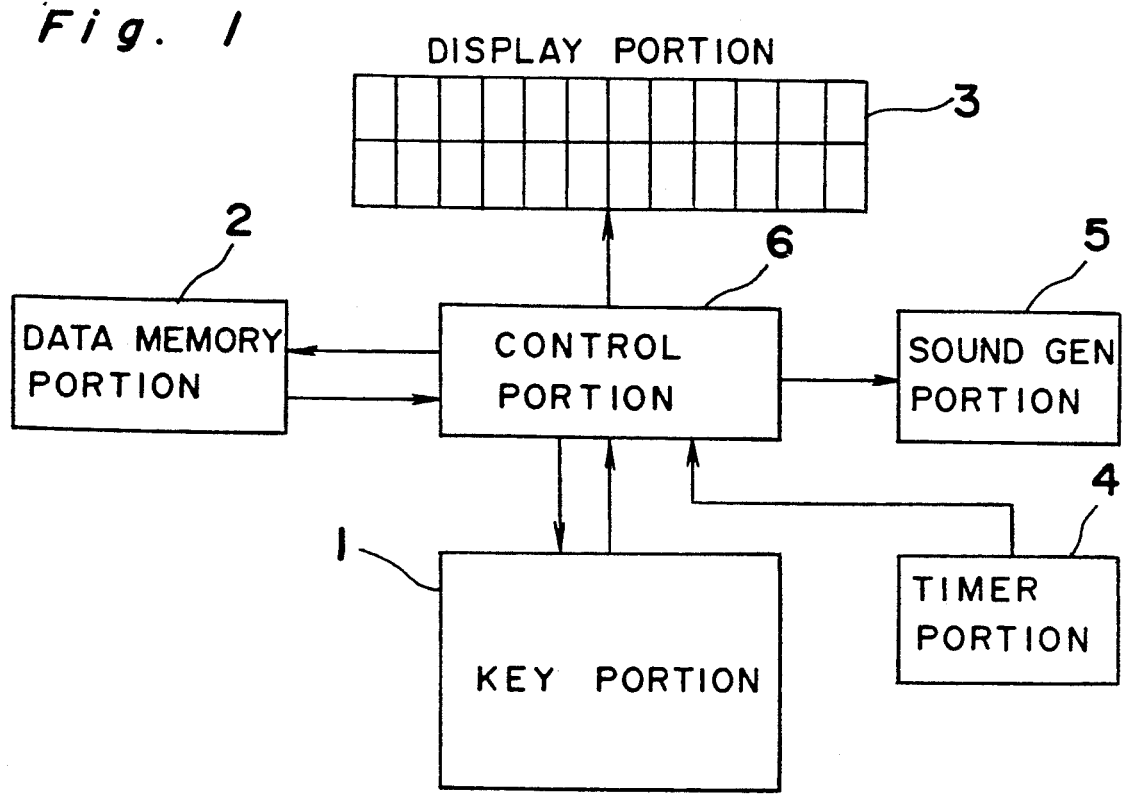
FIG. 1 is a block diagram showing the circuit structure of a schedule displaying device according to one preferred embodiment of the present invention.

Referring to FIG. 1, a circuit structure of a schedule displaying device according to a preferred embodiment of the present invention is shown. The schedule displaying device is basically comprised of a key portion 1 through which a scheduled plan or plans and corresponding time data are inputted or, various instructions are fed to a main device, a data memory portion 2 which stores the inputted plans together with correspond inputted time and date and aligns the data in time sequence, a display portion 3 which displays the scheduled plans and corresponding inputted time, a timer portion 4 which generates clock signals every 0.5 second to a control portion 6, a sound generating portion 5 for generating alarm sounds or touch sounds, and the above-described control portion 6 which controls the whole system.

Figure 2:
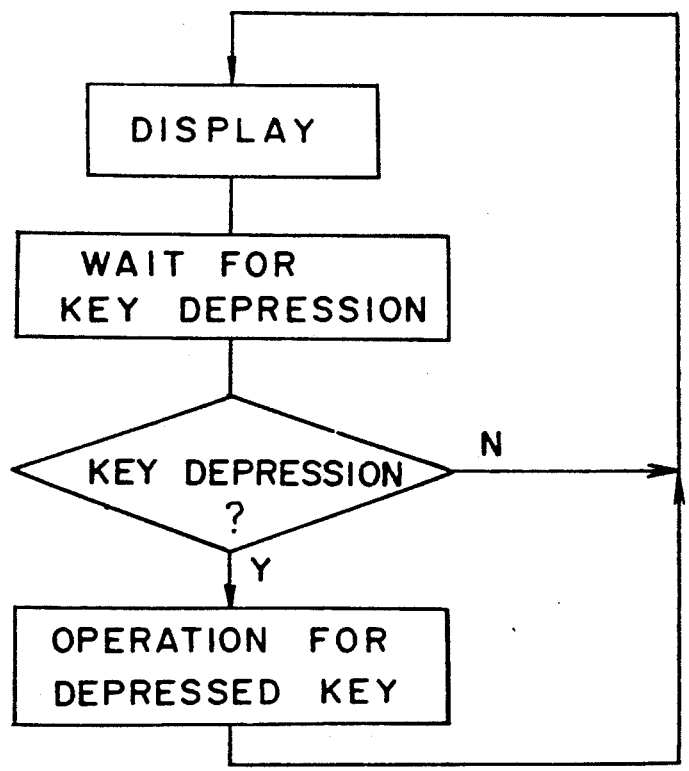
FIG. 2 is a flow-chart showing the fundamental operation of the device of FIG. 1.

FIG. 2 is a flow-chart showing the fundamental operation of the device of FIG. 1.

More specifically, when the display portion 3 is controlled to display the data, the displaying device is put in a waiting condition for key depression. In the case where the key depression is detected, the data memory portion 2, sound generating portion 5, display portion 3 and key portion 4 are controlled for an operation corresponding to the key depression. In the present displaying device, the flow is interrupted every other 0.5 second to detect whether or not a signal is generated from the timer portion 4. Accordingly, every time the generation of a signal is detected, a counter is incremented.

Figure 3:
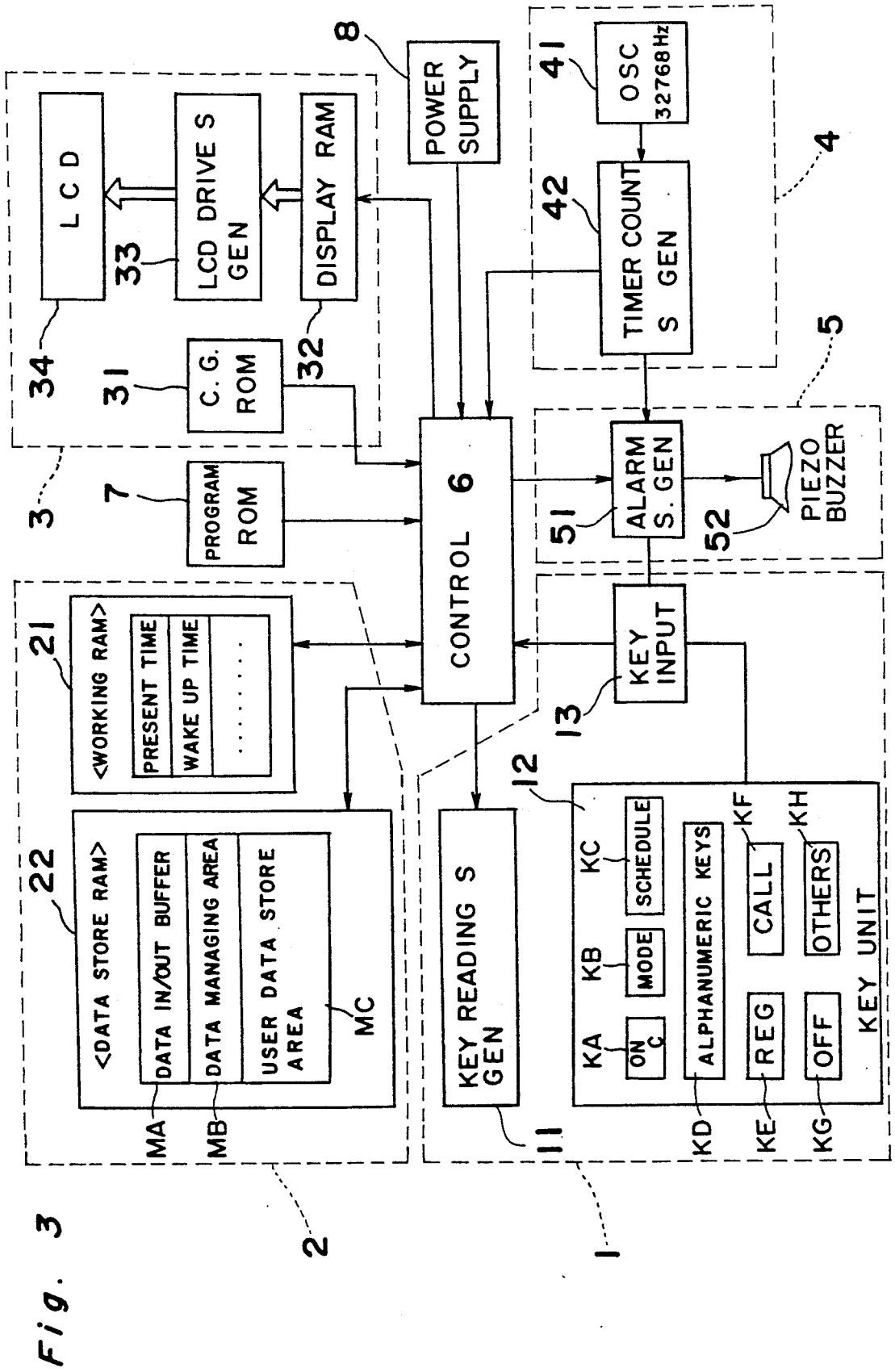
FIG. 3 is a detailed block diagram of FIG. 1.

Referring to FIG. 3, a detail of the block diagram shown in FIG. 1 will be described hereinbelow.

The control portion 6 controls the whole system in accordance with a program ROM 7 having the program for driving the whole system to which the power is fed from a power source 8. In a display unit 34, dot patterns of characters to be displayed are stored. When the characters or the like are to be displayed, the control portion 6 loads dot patterns from a C.G.ROM 31 which correspond to the characters to be displayed and, writes in a display RAM 32. Each one bit of the display RAM 32 corresponds to each one pixcel of the display unit (LCD) 34. A signal generating means 33 generates signals so that the character patterns written in the display RAM 32 are displayed by the display unit (LCD) 34.

A crystal oscillator 41 generates a signal of the frequency of 32.768 KHz, which signal is divided by a timer count signal generating means 42 of a 15-stage divider. The timer count signal generating means 42 generates signals of 1 Hz and 4.096 KHz for time counting and for alarm sounding, respectively. In accordance with an instruction from the control portion 6, an alarm signal generating means 51 generates 4.096 KHz signals for vibrating a piezoelectric buzzer 52.

A key reading signal generating means 11 generates strobe signals for reading a key. When a key among the key arrays provided in a key unit 12 is depressed, a key input means 13 detects and provides a corresponding data to the control portion 6.

A working RAM 21 is for storing the present time or alarm time data, etc., and is activated during operations of an arithmetic calculation or the like. A data store RAM 22 is composed of a user data store area MC mainly for storing the data registered by a user, a data managing area MB for magaging the data stored in the user data store area MC, and a data in/out buffer MA which serves as a working area. The data in/out buffer MA is used to temporarily store the data of the user data store area MC when the data is to be registered or called.

Figure 4:
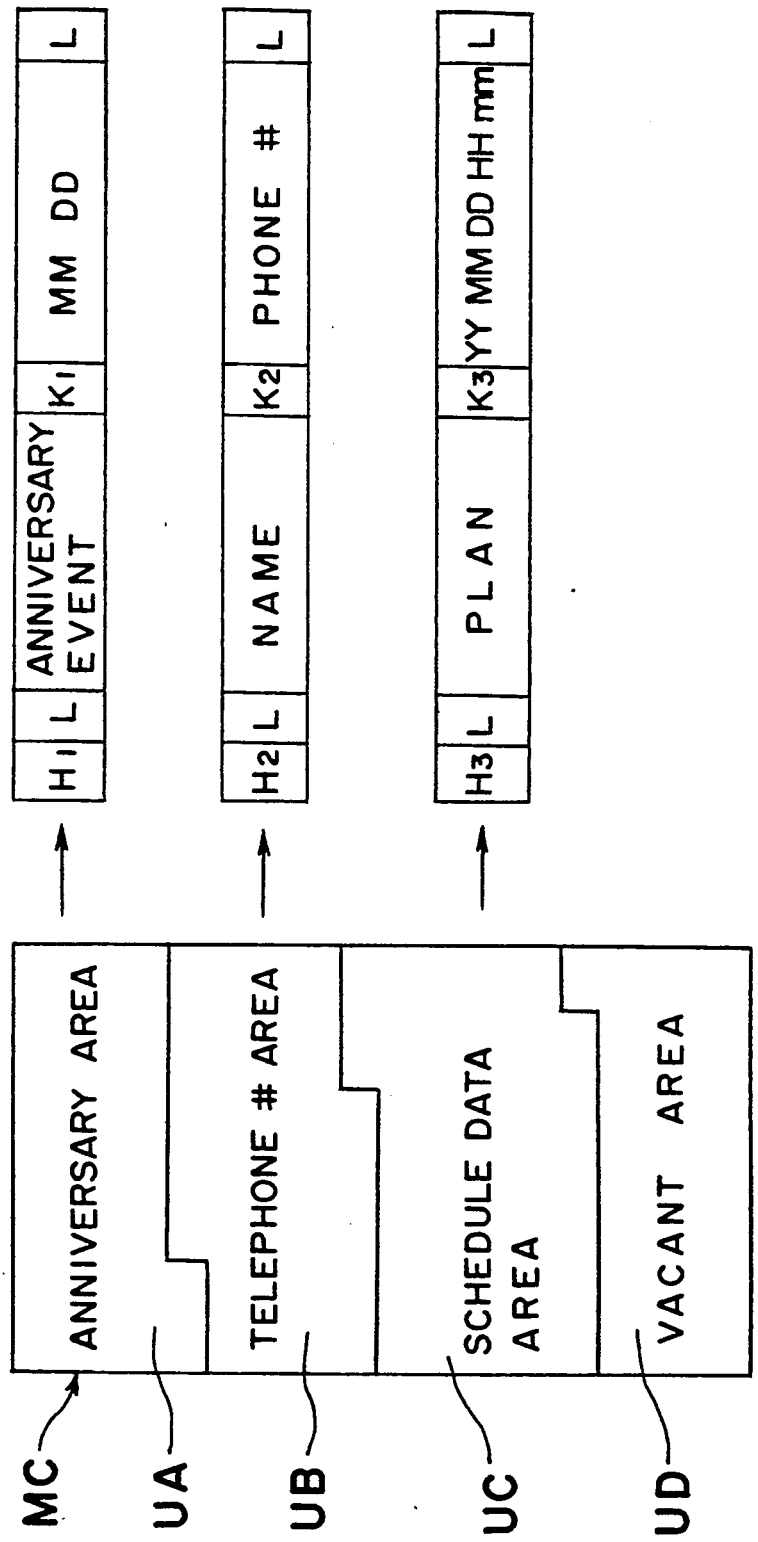
FIG. 4 is a block diagram explanatory of a user data store area MC shown in FIG. 3.

As shown in FIG. 4, the user data store area MC is further divided into four areas, namely, an anniversady area UA for storing the data registered by the user as an anniversary or anniversaries, a telephone number area UB for storing the data registered by the user as a telephone number or numbers, a schedule area UC for storing data registered by the user as a scheduled plan or plans, and a vacant area UD reserved for future use upon necessity. The position of each of the four areas is changed in accordance with the register or erasure of the data, and therefore the size of each area is variable, not fixed. As such, the data managing area MB is provided so as to register the start address, size and the number of data in each area. At the right of FIG. 4 is shown a format of one data in each area. Any data has 1 byte code at the leading head thereof called as a header (Hi) which represents the respective attribute. Any data is formed by two parts between which one byte code (Ki) expressing the border is inserted. The second byte from the head and the last byte express the length of the data. An anniversary data includes an annieversary event and the corresponding month and day, while a telephone number data includes a telephone number and the subscribers' name. A schedule data is comprised of a scheduled plan and the planned time comprising year, month, day, hour and minute.

Referring back to FIG. 3, functions assigned to various keys will be described hereinbelow.

According to the present embodiment, the displaying device has its main functions in a telephone number mode, schedule mode, anniversary mode, timer mode, pocketsize electronic calculator mode and alarm mode. The selection of the mode is carried out by a group of mode keys KB. An $^{on}$C key KA turns on the display unit when it is not lit, and returns the presently-selected mode to the initial state when the display is turned on. A schedule display key KC is used when the schedule of the week (covering eleven days in the present embodiment) is to be displayed. A group of alphanumeric keys KD is provided so as to input the characters or numbers of the data when the anniversary data, telephone number data or schedule data is to be registered or called, or when a calculation key is depressed or when setting the timer or alarm. The data inputted by the alphanumeric keys KD is registered by a register key KE. A call key KF is a key to load and display the data registered in the user data store area MC. An OFF key KG turns off the display, and other keys KH function for other various operations.

Figure 5:
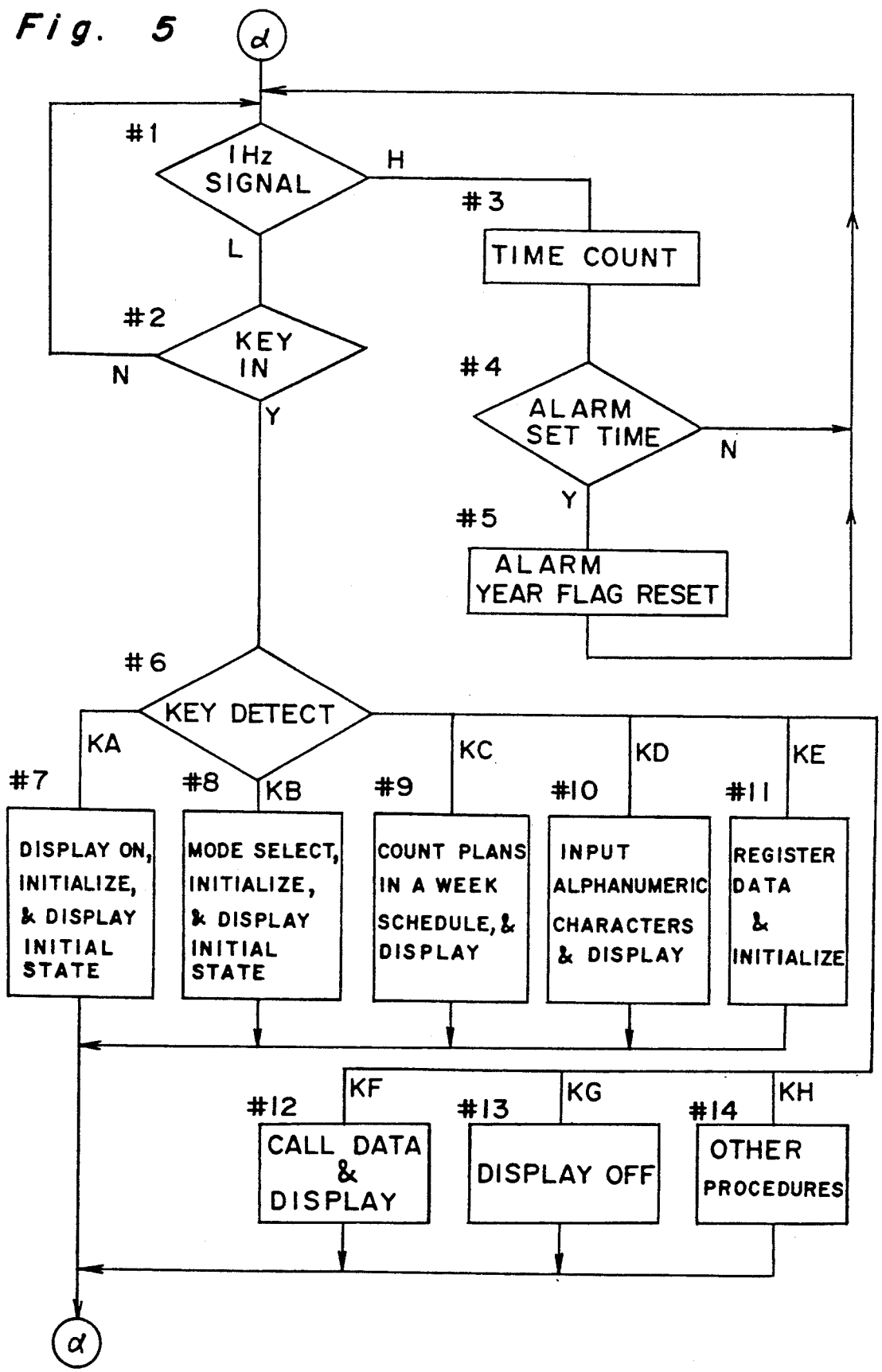
FIG. 5 is a flow-chart showing operations carried out in response to depression of various keys.

Referring to FIG. 5, operations carried out in response to the depression of the above-described various keys will be described.

According to the present embodiment, the control portion 6 receives a 1 Hz signal from the timer count signal generating means 42 and detects a key input signal from the key input means 13 in compliance with the program ROM 7 (steps #1 and #2). A trailing edge of the 1 Hz signal pulse indicates that 0.5 second has passed, and therefore the detection of the trailing edges of the 1 Hz signal pulse in twice indicates that one second has passed. At this time, the present time in the working RAM 21 is incremented by one in the second digit, effecting the time counting. It is needless to say that when it reaches 60 seconds, the second digit is returned to 0, and the minute digit is incremented by one. When a shift-up occurs in a place or digit, the next upper digit is incremented, and successively up to the digit of the year (step #3). Thereafter, if the digit of the minute is incremented as a result of the instant shift-up, it is checked whether or not the present time coincides with either one of the alarm time stored in the working RAM 21 or the schedule data in the data store RAM 22. In the case where the digit of the hour is incremented, it is also checked whether the current month and day coincides to any one of the anniversary data stored in the data RAM 22 (step #4). Consequently, if the coincidence is detected, control portion 6 controls such that an alarm sound is generated by the piezoelectric buzzer 52 at step #5 using 4 KHz signal generated by the timer count signal generating means 42 and fed from alarm sound generating means 51.

Figure 6:
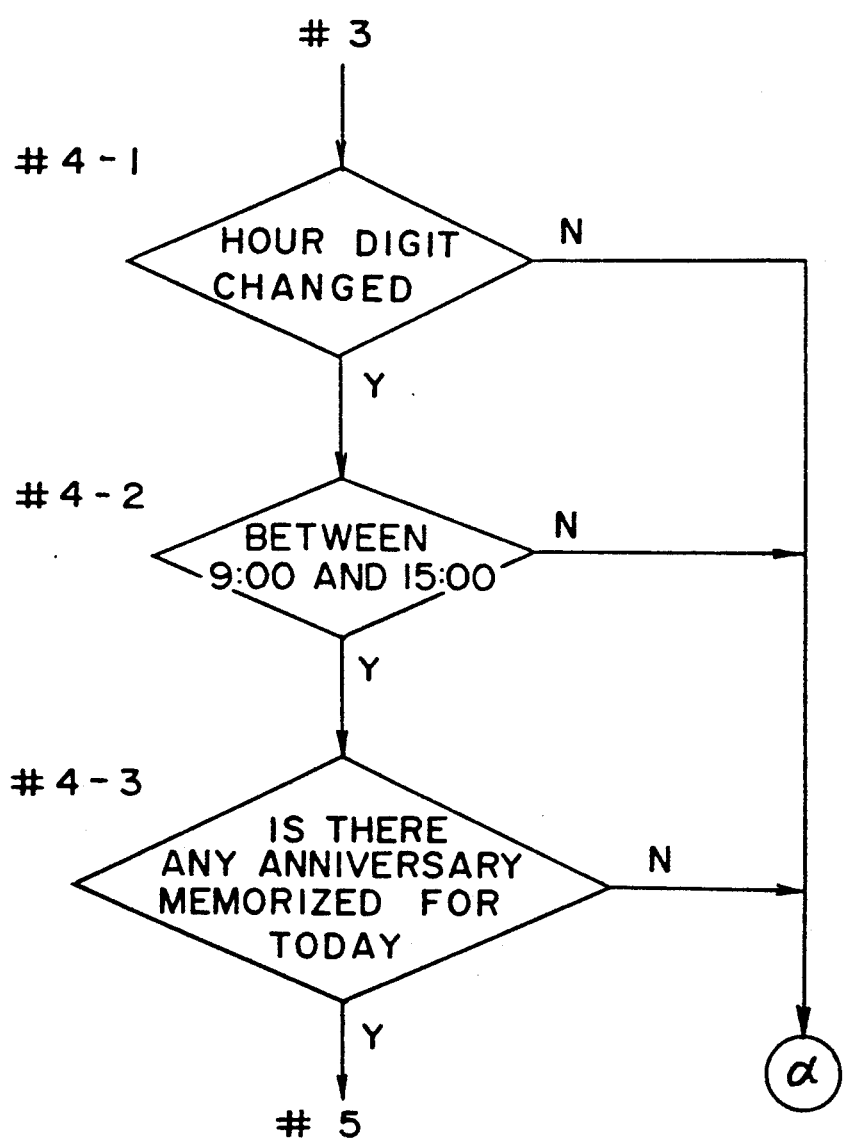
FIG. 6 is a flow-chart showing an operation for generating an alarm sound.

Referring to FIG. 6, an operation for generating alarm sounds in connection with the anniversary data will be described.

At step #4-1, when the digit of the hour is changed, in other words, from 59 minutes to 0 minute, the step proceeds to step #4-2 where it is detected whether the current time is between 9 and 15. In the affirmative, it is retrieved whether an anniversary data having the date coincident with the current date is present (step #4-3). If the data having the coincident date is found, the anniversary event and the corresponding time are displayed in the display portion 1, while an alarm sound is generated for 5 seconds from the sound generating portion 5 (step #5). In the present embodiment, the alarm sound is generated seven times every one hour from 9 o'clock in the morning to 3 o'clock in the afternoon. At step #4, if the current time is not the alarm time, the flow returns to the start. Thus, the timer and alarm portion is operated.

If the key depression is detected at step #2, the flow moves to step #6 where the key is discriminated for the corresponding operation to be carried out. The operations of various keys will be described hereinbelow.

Figures 7, 8, 9:
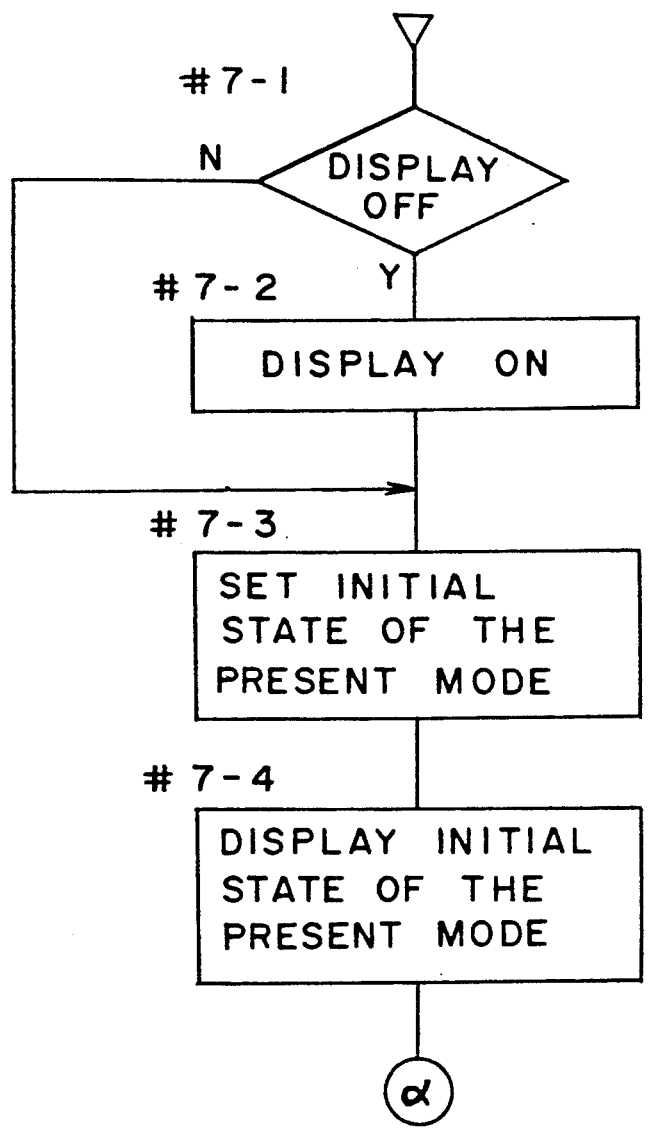
FIG. 7 is a flow-chart showing an operation carried out in response to depression of an $^{on}C$ key KA.
FIGS. 8 and 9 show an example of a display of the initialized state in the schedule mode and in the anniversary mode, respectively.

When the $^{on}$C key KA is depressed (step #7), as shown in FIG. 7, the display unit is turned on if it is not lit, and the present mode is set in the initial state to be displayed. FIGS. 8 and 9 show an example of a display of the schedule mode and the anniversary mode in the initial state, respectively.

When one of the mode keys KB is depressed (step #8), the mode is determined by the depressed key which is then initialized for display.

Meanwhile, when the schedule key KC is depressed (step #9), the number of scheduled plans for each day of the week for about one week (in the present embodiment, eleven days) is counted and displayed, the detailed operation of which will be described now hereinafter.

FIG. 10 is an example of a display in the display unit 34 when the schedule key KC is depressed. As shown in FIG. 10, the display unit 34 is constructed by the upper and lower rows, each having 12 digits. In the upper row, the scheduled plans are displayed in $5 \times 7$ dots, while, in the lower row, the month, day, hour, and minute are displayed in 8 digits, each in two digits, by the 7-segment day expression.

After the data of the scheduled plans and the corresponding month.day.hour.minute are inputted through the key portion 1, the data is re-arranged in time sequence and stored in the data memory portion 2, the procedure of which will be described more in detail later.

The key portion 1 has a key for displaying the schedule of the week. Upon depression of the key, the number of the scheduled plans stored in the data memory portion 2 is counted per each day and displayed in the display unit 34 together with the corresponding days of the week as shown in FIG. 11. It is to be noted that F in FIG. 11 indicates that more than 10 plans are registered and a blank space indicates that no plan is registered. The date at the leftmost column of the display corresponds to the date inputted at step #8-2. For better indentification, a blank column is inserted between the column of Saturday and the column of Sunday. Accordingly, the number of scheduled plans can be displayed for each day of about one week (11 days in the present embodiment), FIG. 12 is a flow-chart showing the operation of the control portion 6 for calculating the number of scheduled plans for each day.

In FIG. 12, X(0)–X(10) represent the data stored in a buffer for storing the number of the scheduled plans for 11 days, X(0) being the number of plans scheduled for the reference day as inputted at step #8-2, and X(i) being the number of plans scheduled for the ith day from the reference day. Reference DD indicates the data stored in a buffer for storing the month and day. In SK(n) of FIG. 13, scheduled plans of the data memory portion 2 are stored from the top row SK(1) such that each row stores one plan and its date. Thus, in row SK(n), nth plan and its date will be stored. Moreover, "SK(n) DATE" at step #8-4 in the flow of FIG. 12 represents the month and day data in the SK(n).

The initialization is carried out from step #8-1 through step #8-3. The presence or absence of the data SK(n) is detected at step #8-12. If the data is detected, the flow proceeds to step #8-4. Otherwise, the flow returns to the start after step #8-13 at which X(0)-X(11) are displayed together with the days of the week, such as shown in FIG. 11. At step #8-4, the DD is compared with the month and day of the data. In the case where the DD is smaller than the month and day of the data, that is, the SK(n) DATE, the flow proceeds from step #8-5 to step #8-7 where the day is incremented by one. If the DD is equal to the month and day of the data, the flow moves from step #8-8 to step #8-10 where the number of the plans is added, and further to step #8-11 in which the succeeding data is processed to read SK(n+1). If the DD is greater than the month and day of the data, the succeeding data is processed at step #8-11.

In the manner as described above, the counted number of the scheduled plans for each day is displayed together with the day of the week in the display unit 34 by the depression of the schedule display key after the schedule mode is selected through the mode key. Accordingly, the schedule displaying device is very convenient in that the number of the scheduled plans of at least, e.g., one week (11 days in the present embodiment), can be obtained at a glance for each day of the week, which contributes to a timesaving feature since the retrieval of the scheduled plans can be carried out in a reduced time.

Referring back again to FIG. 5, when one of the alphanumeric keys KD is depressed (step #10), an internal character code corresponding to the character of the depressed key is generated (step #10-1) as shown in FIG. 14. Then, the internal character code is written in the data in/out buffer 22 (step #10-2), and displayed through the display RAM 32 and the display drive signal generating means 33 (step #10-3).

When the register key KE is depressed (step #11), the data inputted through the group of the keys KD is stored in the user data store area MC in a manner as follows. Specifically, the type of the data to be registered (anniversary data, telephone number data or schedule data) is first selected by the mode key KB. After the selected mode is initialized by the $^{on}$C key KA, the character row of the data to be registered is inputted through the key group KD. By finally depressing the register key KE, the data is registered.

Figure 15:
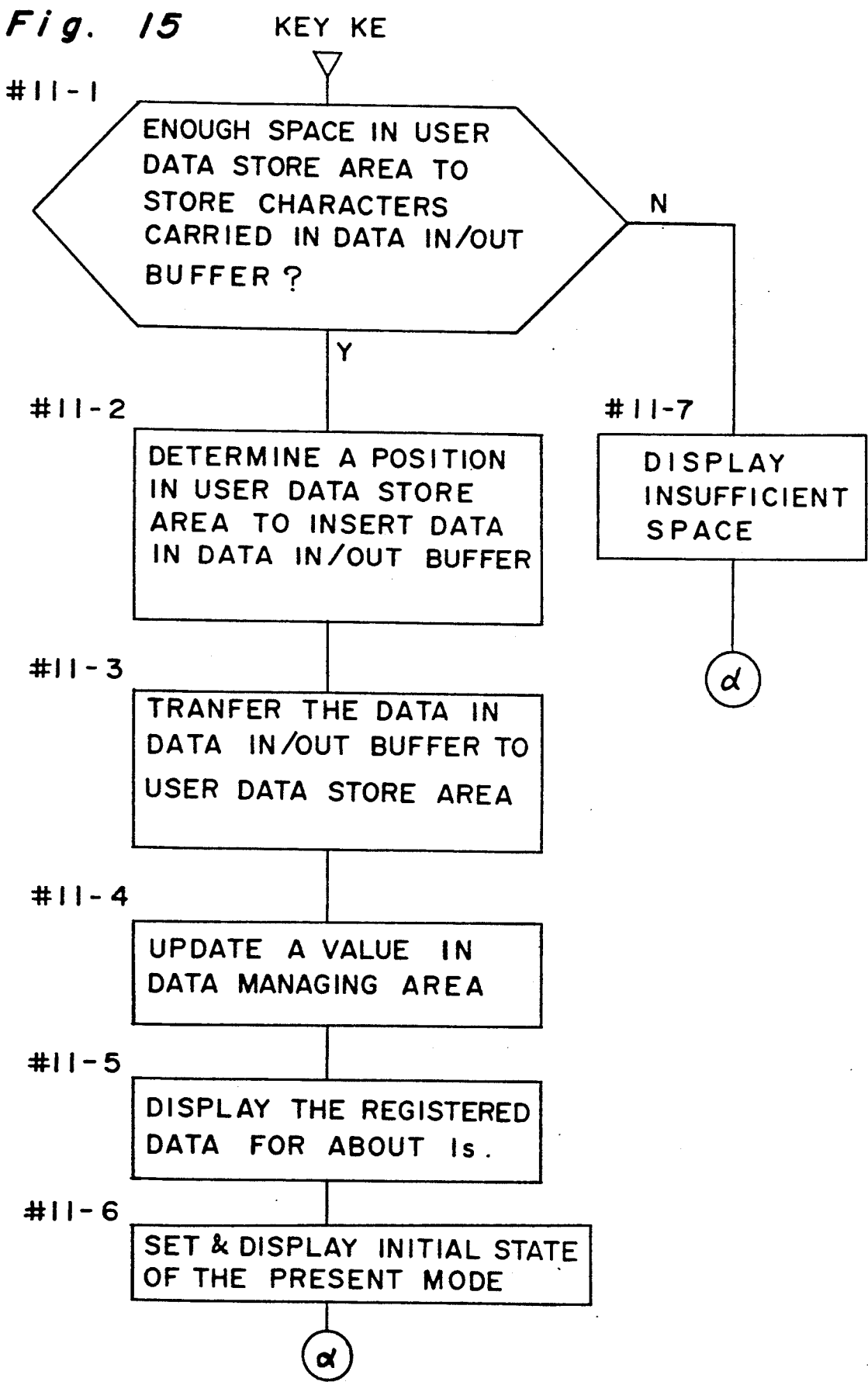
FIG. 15 is a flow-chart showing an operation carried out in response to depression of a key KE.
Figure 17:
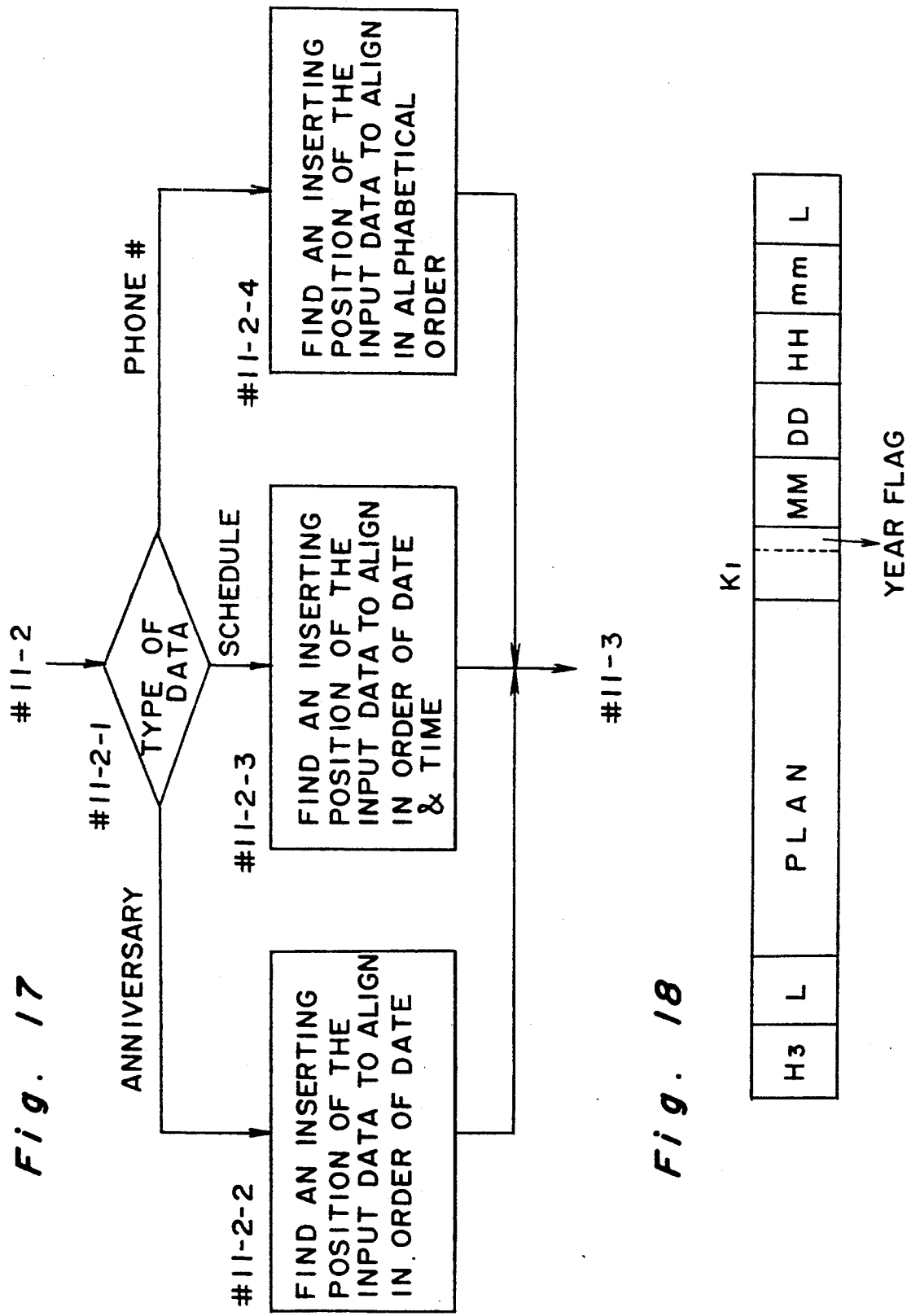
FIG. 17 is a flow-chart showing an operation for finding an inserting position.

As shown in FIG. 15, the presently-inputted characters are temporarily stored in the data in/out buffer MA in which the number of the characters is counted. From the counted number of the characters and the data in the data managing area MB, it is detected whether or not there is enough space remained in the user data store area MC to store the data in buffer MA. If the space is not enough, the fact is indicated as shown in FIG. 16. If the enough space is detected, it is determined where in the user data store area MC to insert the characters stored in the data in/out buffer MA. The inserting position is determined in a different manner among the anniversary data, telephone number data and schedule data. In other words, as shown in FIG. 17, the inserting position is determined such that the anniversary data is aligned in order of month and day, the schedule data in order of date and time, and the telephone number data in alphabetic order of subscribers, names.

Figure 18:
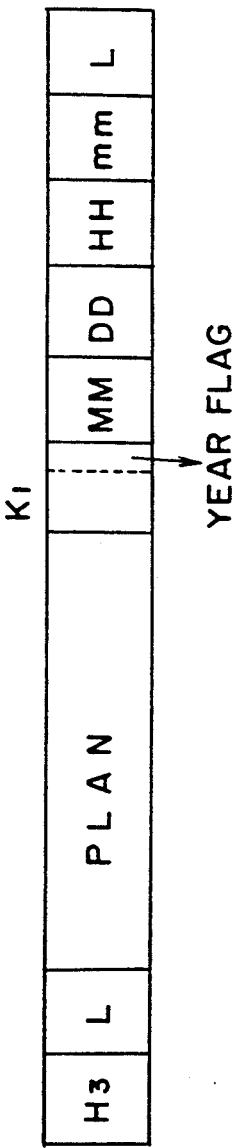
FIG. 18 is a data format.

FIG. 18 shows a detail of the data SK(n), and particularly, a data format for expressing the month.day.hour.minute of the data (in the drawings, these are indicated as MM, DD, HH and mm). Conventionally, the data is constituted by 32 bits, including the month, day, hour, and minute, each in 8 bits, and is aligned in the order of the date only in terms of the big-and-small relationship of the 32 bits. On the contrary, according to the present embodiment, the data has one more bit for a year flag in addition to the 32 bits, as shown in FIG. 18, which is served by one bit of the 1 byte used for a bordering code between the month.day.hour.minute part and the event part. Therefore, the total length of the data is not increased. The data of the "1" year flag, namely, the data of the plans scheduled for the succeeding year is stored after the data of the plans of the current year which is already stored in the data memory portion 2. Furthermore, the data of the "0" year flag, that is, the data of the current year is stored to be aglined in time sequence with respect to the data of the current year already stored in the data memory portion 2.

Figure 19:
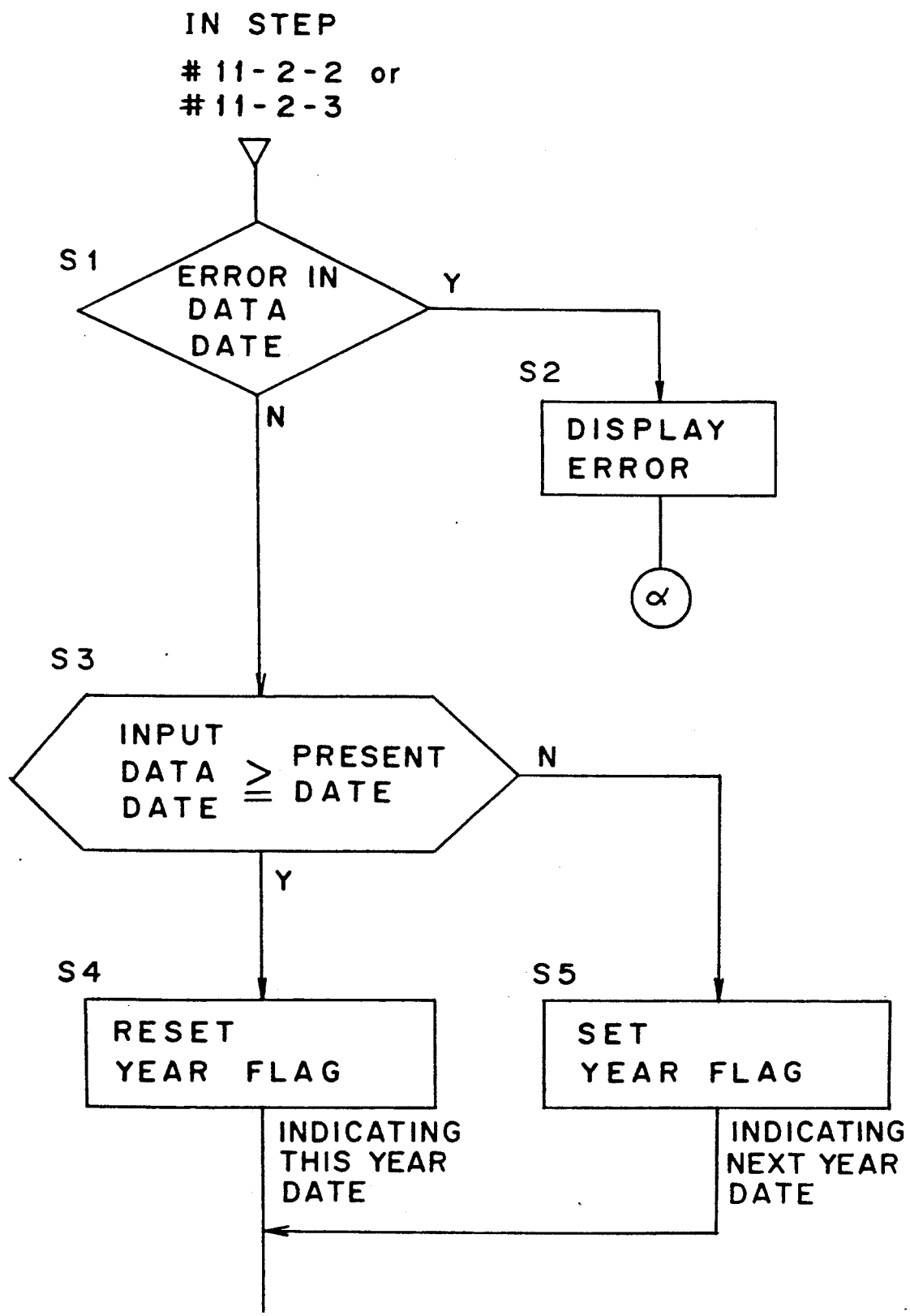
FIG. 19 is a flow-chart of an operation for setting a year flag.

The year flag is set at step #11-2-2 or #11-2-3 shown in FIG. 19, the operation of which will be described, Referring to FIG. 19, improper input of the data (for example, 13th month, 50th day, 26 hours, 70 minutes, etc) is checked at step S1. If an error is found in the inputted data, the flow moves to step S2 to display the fact. If it is not the case at step S1, the flow goes to step S3 where the month.day of the inputted data is compared with the month.day of the current time. In the case where the date of the inputted data coincides to or is antecedent to that of the current day, the data is determined to be the data of the current year, thereby to reset the year flag (step S4). If the date of the inputted data is prior to the date of the current day, the inputted data is determined to be the data of the succeeding year since it is not general to schedule a plan for a precedent date, and the year flag is set (step S5).

Thus, the inserting position of the inputted data is determined in consideration of the year flag and month-.day.hour.minute data so that the inputted data will be aligned in true time sequence order. Accordigly, a plan scheduled for sometime in January next year will be positioned after a plan scheduled for sometime in December this year.

The year flag is reset when a year is changed, as will be described with reference to FIGS. 20 and 21.

Figure 20:
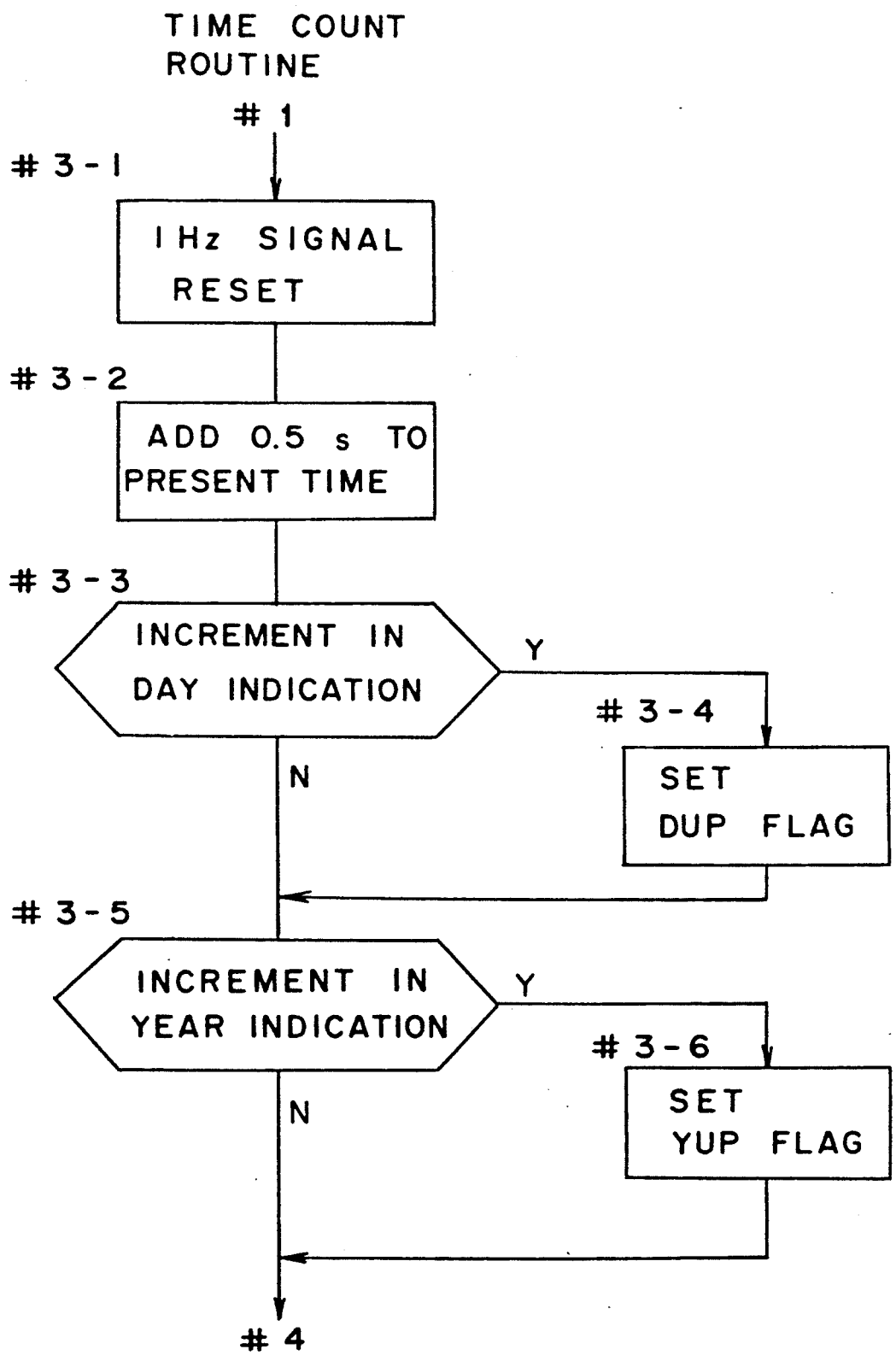
FIG. 20 is a flow-chart of the time count routine.

Referring to FIG. 20, a detail of the time count routine at step #3 will be described. At step #3-1, 1 Hz signal is reset, and the flow goes to step #3-2. At step #3-2, the time is advanced by 0.5 second because the 1 Hz signal is reversed every 0.5 second. If the day indication is changed subsequent to the advancement of the time (step #3-3), a DUP flag is set (step #3-4). In the case where the year indication is also changed (step #3-5), a YUP flag is set (step #3-6).

Figure 21:
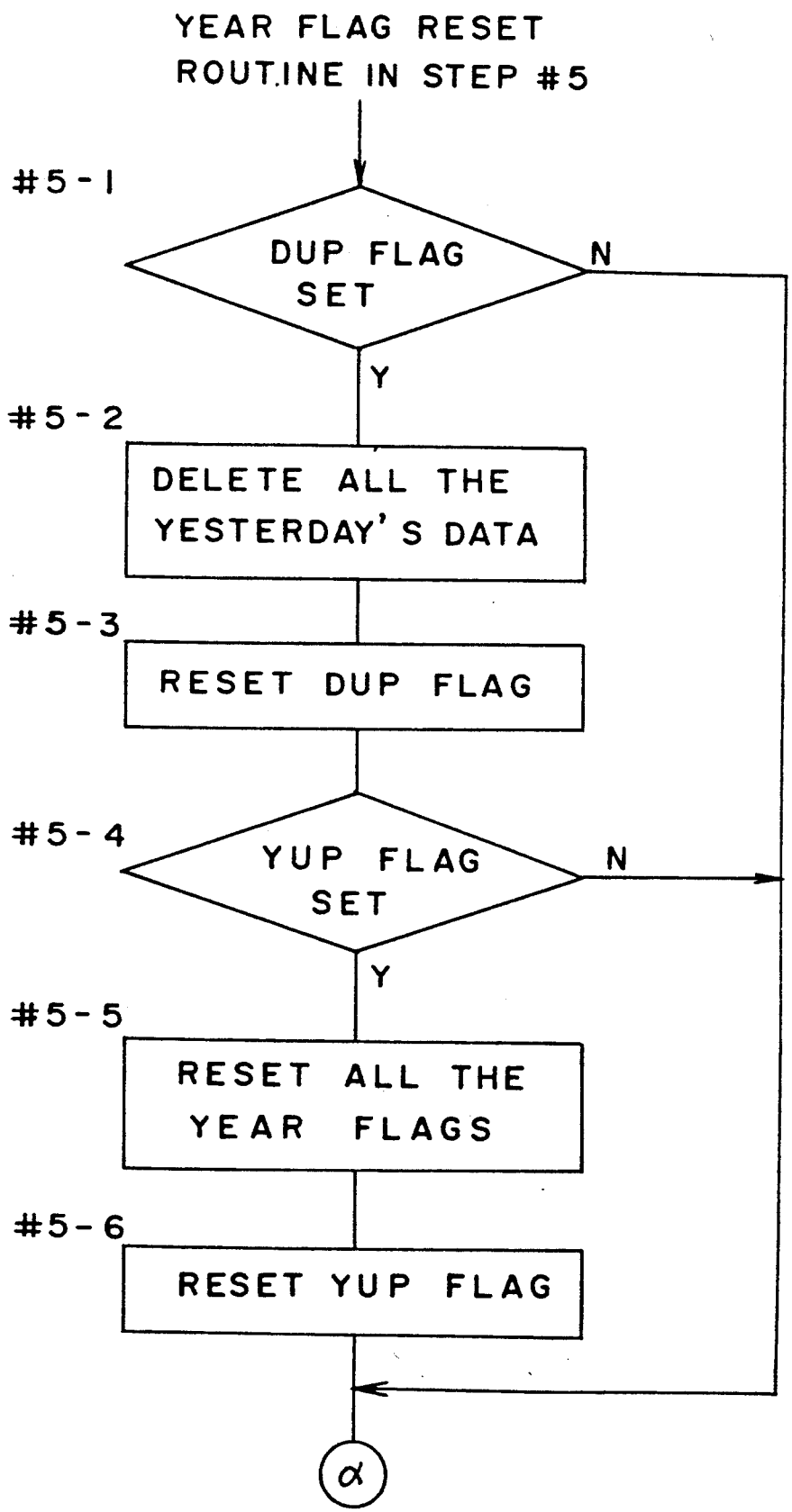
FIG. 21 is a flow-chart of the year flag reset

In FIG. 21, a detail of the year flag reset routine at step #5 is shown. When it is detected at step #5-1 that the DUP flag is set, the flow moves to step #5-2. If the DUP flag is not set, the flow returns to the start. At step #5-2, all the data up to the preceding day is erased Thereafter, the DUP flag is reset at step #5-3, with the flow proceeding to step #5-4. In the case where the date is changed, it may be possible that the year is also changed. Therefore, if the YUP flag is to be reset, the flow returns to the start. If the YUP flag is set, the flow proceeds to step #5-5. All the year flags are reset when the year is changed. Then, the YUP flag is reset at step #5-6 and the flow returns to the start.

The data should be transferred after the inserting position is determined (step #11-1), the procedure thereof being described with reference to FIG. 22.

Figure 22:
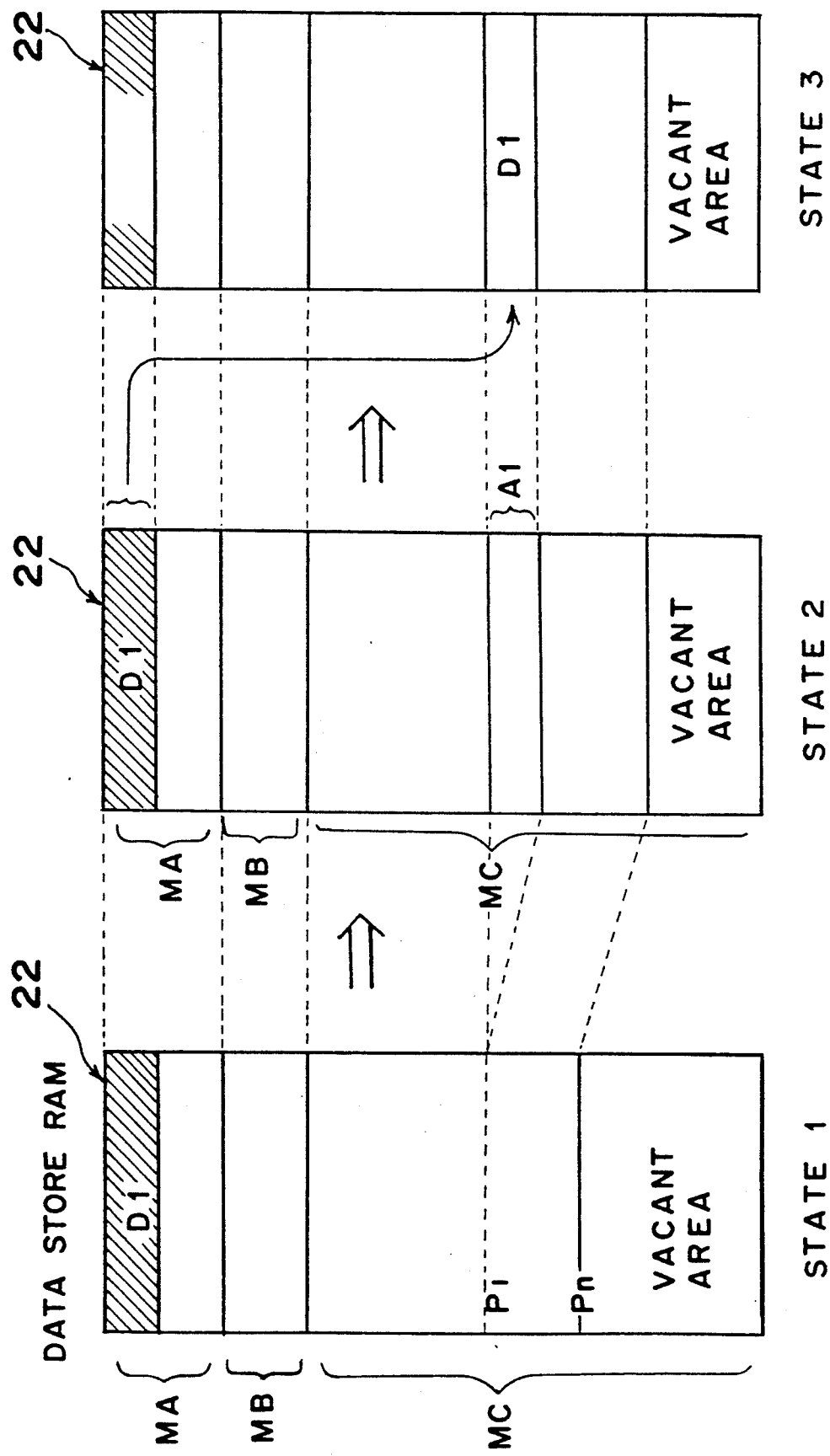
FIG. 22 is a diagram of a data store RAM.

In FIG. 22, it is to be noted that D1 indicates the group of characters to be registered and P1 indicates the inserting position thereof determined at step #11-2. In the first place, as shown in STATE 1, the data from a point P1 to the last point Pn in the already-used area is shifted down by the amount of the number of the characters of the data D1 to be registered (STATE 2). A vacant area is consequently produced as indicated by A1 which has the exact size to allow the data D1 to be inserted. Then, the data D1 is transferred as shown in STATE 3. Upon completion of the transfer of the data D1, the data in the data managing area MB is corrected to express the content of STATE 3 from that of STATE 1. Thus, the main operation of the register key KE is completed. After the finally-registered data is displayed for approximately one second, the displaying device is brought back to the initial state.

The operation of the call key KF will be described last.

Figure 23:
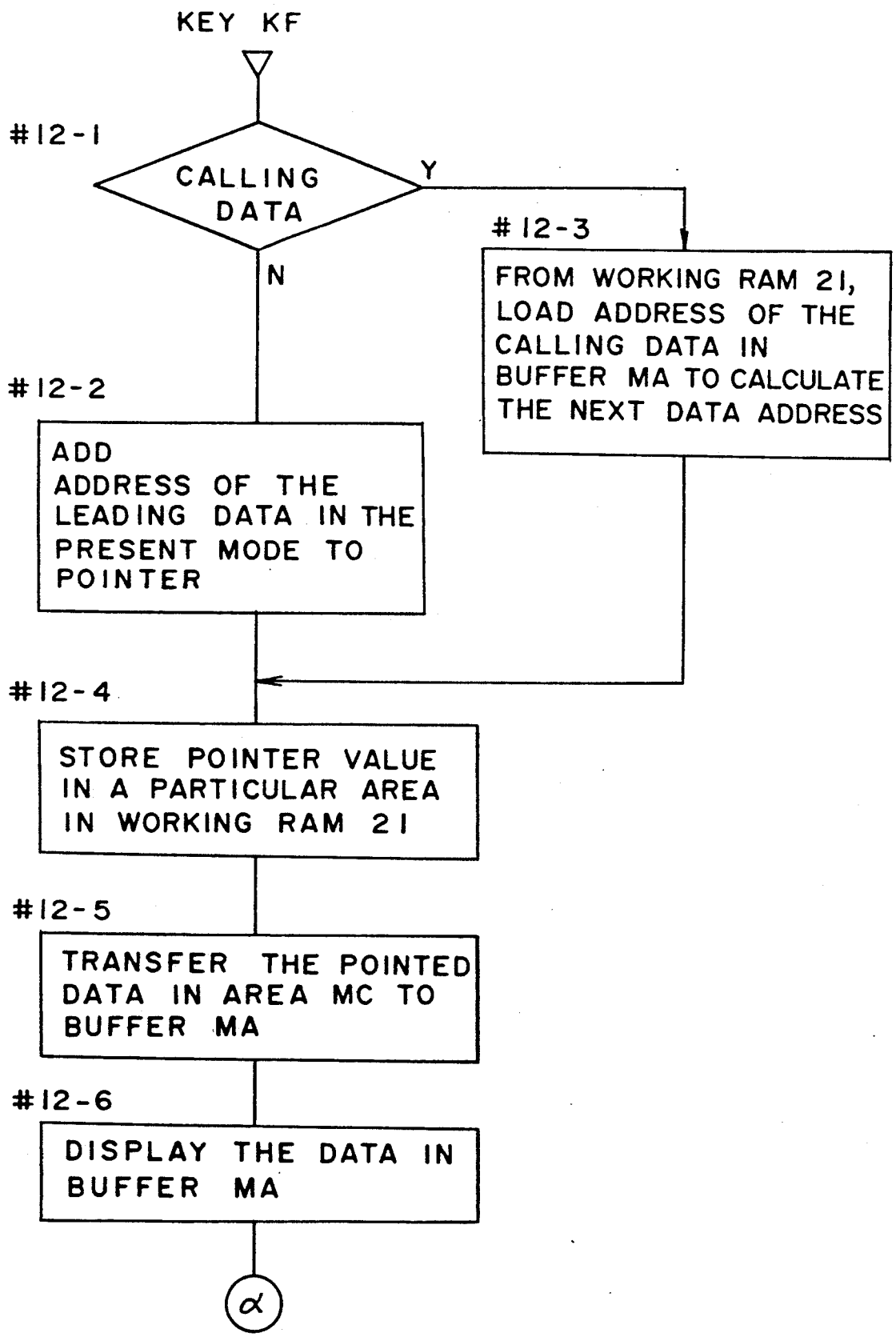
FIG. 23 is a flow-chart showing an operation carried out in response to depression of a key KF.

The type of the data to be called up is selected by the mode key KB, and the selected mode is initialized by the $^{on}C$ key KA. Then, by depressing the call key KF, the registered data is called to be displayed. If the call key KF is continuously depressed, the registered data is successively displayed one after another up to the last one. As shown in FIG. 23, when the call key KF is depressed (step #12), it is first checked whether or not a data is already being called (step #12-2). If the data is not being called, the address of the leading data in the group of data in the present mode is added to a pointer (step #12-2). The address of the leading data is written in the data managing area MB. Meanwhile, if the data is being called, the address of the succeeding data is calculated from the address of the presently-called data (which is written in the working RAM 21 after the calling) by loading and adding the code (L) showing the length of the data stored after the header (Hi) of each data, to the address of the present header (Hi). The address thus obtained is added to the pointer. The address added to the pointer is temporarily stored in the working RAM 21 (step #12-5) and the pointed data is loaded in the data in/out buffer MA (step #12-5). At this time, the number of the characters to be loaded can be known from the next code (L) of the header (Hi) of FIG. 4. Then, the data loaded in the data in/out buffer MA is, through the display RAM 32 and the display drive signal generating means 33, displayed by the display unit 34 (step #12-6).

Although the present invention has been fully described by way of example in connection with one preferred embodiment thereof, various changes and modifications would be apparent to those skilled in the art. Such changes and modifications should be construed as included within the scope of the present invention as defined by the appended claims unless they depart therefrom.

What is claimed is:

1. A schedule displaying device, comprising:
    means for storing a plurality of scheduled plans together with corresponding scheduled time data thereof using a unit smaller than the year, said plurality of scheduled plans being stored in said storing means in time sequence;
    means for inputting said plurality of scheduled plans and corresponding scheduled time data into said storing means;
    means for simultaneously displaying said plurality of scheduled plans and corresponding scheduled time data stored in said storing means in an order that is identical to an order in which said plurality of scheduled plans and corresponding scheduled time data is stored in said storing means;
    means for counting time;
    means for comparing said inputted corresponding scheduled time data with a current time counted by said counting time means; and
    means for controlling said storing means, upon receipt of a signal form said comparing means, to store one schedule plan, in which said one schedule plan is time sequenced after already-stored schedule plans when a scheduled time of said one schedule plan is precedent to said current time, and for controlling said storing means to store said one schedule plan so that said one schedule plan is time sequenced with respect to said plurality of scheduled plans stored in said storing means when said scheduled time of said one schedule plan is after said current time.

2. The schedule displaying device of claim 1, wherein said storing means comprises a memory.

3. The schedule displaying device of claim 1, wherein said display means comprises an LCD display.

4. The schedule displaying device of claim 1, wherein said inputting means comprises a keyboard.

5. The schedule displaying device of claim 1, wherein said inputted scheduled plans and time data are sorted in date order representing a next year when said scheduled time of said scheduled plan is after said current time.

6. The schedule displaying device of claim 1, further comprising means for producing an alarm indication when an anniversary day occurs.

7. The schedule displaying device, comprising:
means for storing a plurality of scheduled plans that correspond to respective scheduled times, which include a day of a period of time;
means for counting the number of plurality of scheduled plans stored in said storing means for each day;
means for determining said day of a predetermined period of time that corresponds to said day;
a display; and
means for controlling said display to display said number of plurality of scheduled plans counted by said counting means, together with an indication of said day of said predetermined period of time obtained by said calculating means.

8. The schedule displaying device of claim 7, wherein said storing means comprises a memory.

9. The schedule displaying device of claim 7, wherein said display comprises an LCD display.

10. The schedule displaying device of claim 7, wherein said predetermined period of time comprises a week.

11. The schedule displaying device of claim 7, further comprising means for producing an alarm indication when an anniversary day occurs.

12. The schedule displaying device, comprising:
a memory for storing a plurality of scheduled plans together with scheduled time data thereof;
means for inputting said plurality of scheduled plans and scheduled time data into said memory;
a display for displaying said plurality of scheduled plans and scheduled time data stored in said memory in an order that is identical to an order in which said plurality of scheduled plans and scheduled time data has been stored in said memory;
means for generating time count signals;
means for comparing said inputted scheduled time data with a current time indicated by said time count signal generating means; and
means for controlling said memory upon receipt of a signal from said comparing means, to store one schedule plan in a manner in which said one schedule plane is time sequenced after already-stored schedule plans when a scheduled time of said one schedule plan is precedent to said current time, and for controlling said memory to store said one schedule plan in such a manner that said one schedule plan is time sequenced with respect to said plurality of scheduled plans stored in said memory when said scheduled time of said one schedule plan is after said current time.

13. The schedule displaying device of claim 12, further comprising means for generating an alarm signal.

14. The schedule displaying device of claim 13, wherein said alarm signal generating means comprises a buzzer.

15. The schedule displaying device, comprising:
means for storing a plurality of scheduled plans together with scheduled time data thereof using a unit smaller than the year, said plurality of scheduled plans being stored in said storing means in time sequence;
means for inputting said plurality of scheduled plans and scheduled time data into said storing means;
means for simultaneously displaying said plurality of scheduled plans and scheduled time data stored in said storing means in an order that is identical to an order in which said plurality of scheduled plans and scheduled time data is stored in said storing means;
means for counting time;
means for comparing said inputted scheduled time data with a current time counted by said counting time means; and
means for controlling said storing means, upon receipt of a signal from said comparing means, to store one schedule plan in a manner in which said one schedule plan is time sequenced after already-stored schedule plans when a scheduled time of said one schedule plan is precedent to said current time, and for controlling said storing means to store said one schedule plan in such a manner that said one schedule plan is time sequenced with respect to said plurality of scheduled plans stored in said storing means when said scheduled time of said one schedule plan is after said current time, said inputted plurality of scheduled plans and scheduled time data being sorted in date order representing a next year when said scheduled time of said one schedule plan is after said current time.

* * * * *

UNITED STATES PATENT AND TRADEMARK OFFICE
CERTIFICATE OF CORRECTION

PATENT NO. : 5,222,209
DATED : June 22, 1993
INVENTOR(S) : K. MURATA ET AL

It is certified that error appears in the above-indentified patent and that said Letters Patent is hereby corrected as shown below:

Column 1, line 31, change "object" to —object,—.
         line 66, insert —unit;— after "in a display".
Column 2, line 9, insert —enough;—after "not".
         line 16, insert —routine; after "reset".
         line 36, change "touch" to —key-touch—.
Column 6, line 50, change "subscribers," to —subscribers'—.
         line 52, change "month.day.year" to —month-day-year—.
Column 7, line 11, change "month.day" to —month-day—.
         line 12, change "month.day" to —month-day—.
         line 23, change "month.day.hour.minute" to —month-day-hour-minute—.
Column 9, line 20, change "The" to —A—.
         line 45, change "The" to —A—.
Column 10, line 7, "plane" to —plan—.
          line 21, change "The" to —A—.

Signed and Sealed this

Thirty-first Day of May, 1994

Attest:

BRUCE LEHMAN

Attesting Officer      Commissioner of Patents and Trademarks